June 23, 1953 C. A. BROOKS 2,642,836
FISH BAIT INCUBATOR
Filed June 1, 1951 2 Sheets-Sheet 1
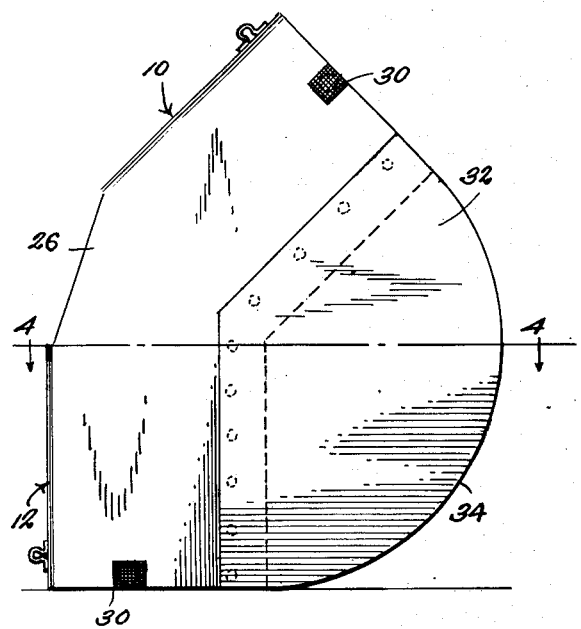
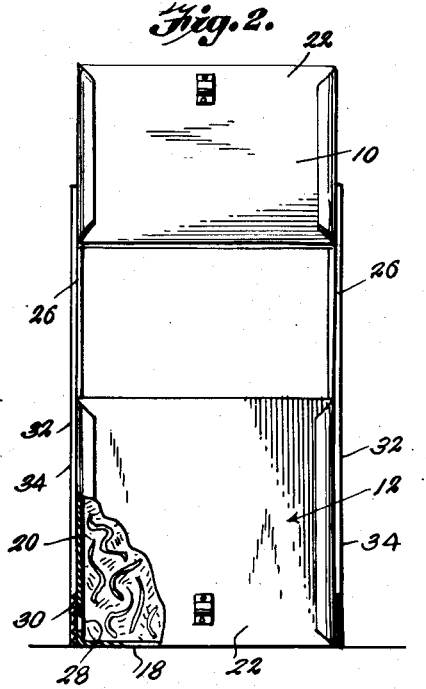
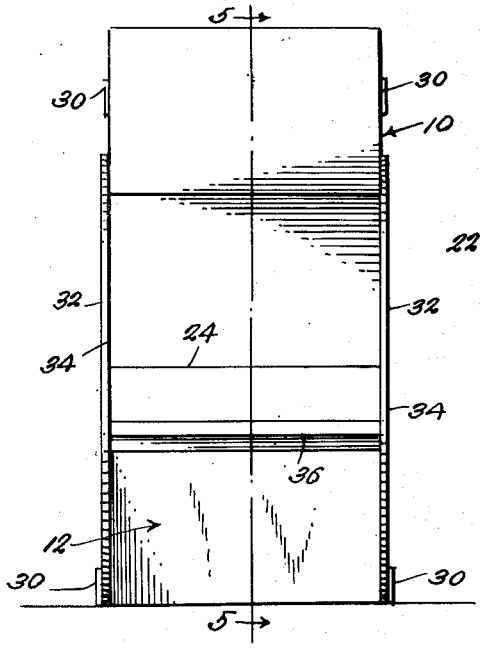
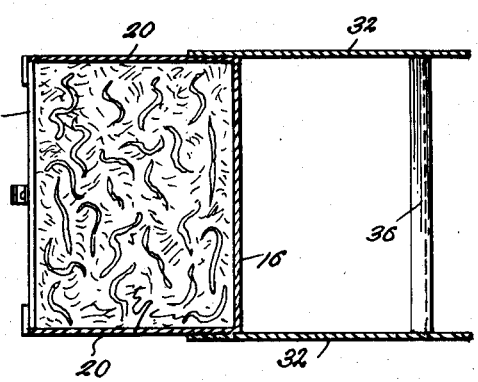
INVENTOR.
CHARLES A. BROOKS
BY
Patrick D. Beavers
ATTORNEY June 23, 1953     C. A. BROOKS     2,642,836
FISH BAIT INCUBATOR Filed June 1, 1951     2 Sheets-Sheet 2

INVENTOR.
CHARLES A. BROOKS
BY
Patrick D. Beaver
ATTORNEY

Patented June 23, 1953

2,642,836

UNITED STATES PATENT OFFICE 2,642,836

FISH BAIT INCUBATOR

Charles A. Brooks, Roanoke, Va.

Application June 1, 1951, Serial No. 229,453

1 Claim. (Cl. 119—15)

This invention relates to a fish bait incubator and has for its primary object to cultivate the propagation and growth of live bait such as fish worms.

Another object is to keep the bait in a healthy condition, to avoid the drowning of the bait through the application of excessive moisture and to enable the earth or compost in which the bait is cultivated to be kept in an aerated and loosened condition.

A further object is to enable the user to readily select and extract a specimen from the incubator and at the same time prevent the escape of other specimens of bait therefrom.

The above and other objects may be attained by employing this invention which embodies among its features a pair of adjacent open ended receptacles lying along an obtuse angle with their open ends joined together, rockers carried by the receptacles on opposite sides thereof, and curved edges on the rockers lying in spaced concentric relation to the junction of the receptacles.

Other features include, a screened opening extending through a side wall of each receptacle, substantially V-shaped sections on the side walls of the receptacles and extending between the open ends thereof to define with the upper and lower edges of the front walls of the receptacles an access opening and removable closure means for said access opening to prevent the escape of bait specimens from the incubator.

In the drawings:

Figure 1 is a side view of a bait incubator embodying the features of this invention;

Figure 2 is a front view of the device;

Figure 3 is a rear view of the device;

Figure 4 is a horizontal sectional view taken substantially on the line 4—4 of Figure 1;

Figure 5:
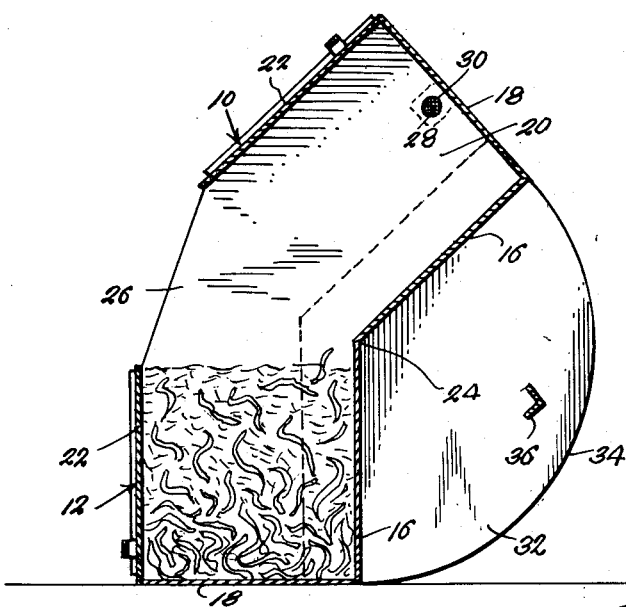
Figure 5 is a vertical sectional view taken substantially on the line 5—5 of Figure 3.

Referring to the drawings in detail the incubator comprises two separate rectangular open ended receptacles of substantially identical construction designated respectively generally 10 and 12. Each receptacle is substantially rectangular in cross section and comprises a back wall 16, a bottom 18, side walls 20 and a front wall 22. As shown in the drawings the back walls 16 of the receptacles 10 and 12 are joined together at 24 and bent to cause the compartments to lie at an obtuse angle to one another. The side walls 20 are extended to lie between the open ends of the receptacles along opposite sides thereof and form side panels 26 which together with the adjacent edges of the front walls 22 define an access opening through which access may be had to either receptacle 10 or 12.

Formed in the side walls 20 of the receptacles 10 and 12 adjacent the bottom walls 18 are ventilating openings 28 which are covered by screens 30, and secured to opposite side walls 20 of the receptacles 10 and 12 are rockers 32 having convexly curved edges 34 which lie substantially concentric about the junction 24 of the back walls 16 and extend from the bottom 18 of the compartment 10 to the bottom wall 18 of the receptacle 12. A cross brace 36 extends transversely between and is connected at opposite ends to the rockers 32.

In the preferred form of the invention the front wall 22 of the receptacle 10 is provided adjacent the access opening with eyes 38 to which is hingedly coupled one edge of a door frame 40 which is preferably covered by a screen 42 and which carries along its side remote from the eyes 38 a latch 44 for engagement with the front wall 22 of the receptacle 12. It will thus be seen that with the access opening closed by the screen 42 escape of specimens of bait from the incubator will be avoided and yet access may be had to the receptacles when so desired.

Figure 6:
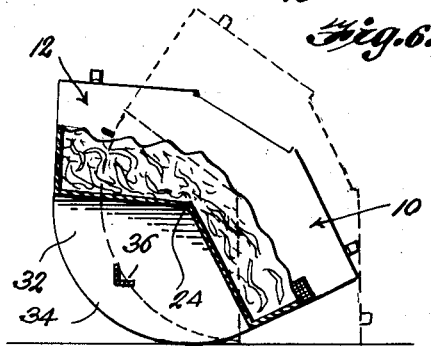
Figure 6 is a side view on a reduced scale of the device partly in section showing it being rocked from one position to another.
Figure 7:
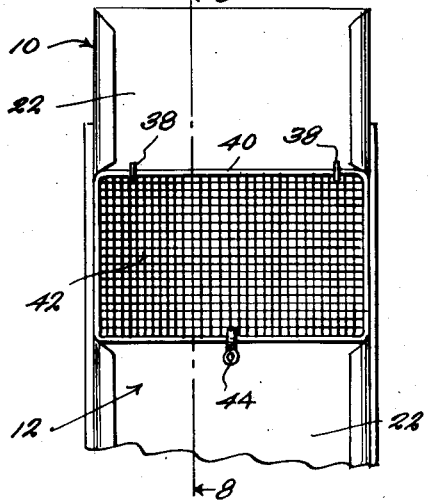
Figure 7 is a fragmentary front view showing the closure in place over the access opening.
Figure 8:
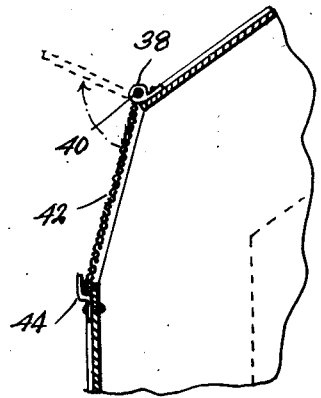
Figure 8 is a fragmentary sectional view taken substantially along the line 8—8 of Figure 7.

In use, the device is used substantially as shown with one or the other receptacles 10 or 12 in an upright position. The receptacle is then filled through the access opening and its open upper end with the compost in which the bait is to be cultivated. With the compost thus in place the bait is introduced into the receptacle and the access opening is then closed. Water may be introduced into the receptacle and even though an excess amount may be used, drowning of the bait cannot occur as the excess moisture will drain out through the openings 28. Aeration and loosening of the compost is accomplished by rocking the device on the rockers 32 substantially as shown in Figure 8 and to avoid corrosion and like damage to the walls of the compartments, the compost and bait can be alternately deposited in one or the other receptacle simply by rocking it from the position shown in Figure 5 to substantially the position shown by the broken lines in Figure 6. It will be evident that by the use of this device the cultivation and propagation of bait may be conducted with but a minimum expenditure of labor and time and yet the bait is easily accessible for use.

What is claimed is:

A device of the character described comprising a pair of receptacles each provided with a bottom wall, an outer wall, side walls, an inner wall, said side and inner walls being common to both receptacles and centrally disposed to extend said receptacles at an obtuse angle relative to each other, a pair of rockers each secured to a side wall and each having a convex outer edge, said outer walls defining an opening therebetween, a screened door for said opening hinged to the free end of one of said outer walls, said side walls each having openings therein adjacent their associated bottom walls, and a screen covering secured to said side walls and extending over each of said last-mentioned openings.

CHARLES A. BROOKS.

References Cited in the file of this patent

UNITED STATES PATENTS

| Number | Name | Date |
|---|---|---|
| 282,199 | Kitchen | July 31, 1883 |
| 491,737 | Kernodle | Feb. 14, 1893 |
| 706,023 | Close | Aug. 5, 1902 |
| 1,047,052 | Hibbard | Dec. 10, 1912 |
| 1,893,918 | Wilson | Jan. 10, 1933 |
| 1,914,473 | Wilson | June 20, 1933 |

FOREIGN PATENTS

| Number | Country | Date |
|---|---|---|
| 104,954 | Switzerland | May 16, 1924 |